United States Patent
Abraham et al.

(10) Patent No.: US 10,291,517 B1
(45) Date of Patent: May 14, 2019

(54) GENERATING A DUMMY VLAN TAG FOR INDICATING QUALITY OF SERVICE CLASSIFICATION INFORMATION IN A DISTRIBUTED ROUTING SYSTEM

(71) Applicant: Juniper Networks, Inc., Sunnyvale, CA (US)

(72) Inventors: Blued Abraham, Thiruavlla (IN); Sridhar Talari Rajagopal, Bangalore (IN); Nirmala J, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 7 days.

(21) Appl. No.: 15/381,917

(22) Filed: Dec. 16, 2016

(51) Int. Cl.
*H04L 12/713* (2013.01)
*H04L 12/851* (2013.01)
*H04L 12/46* (2006.01)

(52) U.S. Cl.
CPC ........ *H04L 45/586* (2013.01); *H04L 12/4641* (2013.01); *H04L 47/24* (2013.01)

(58) Field of Classification Search
None
See application file for complete search history.

(56) References Cited

U.S. PATENT DOCUMENTS

| 8,483,218 | B2* | 7/2013 | Lee | ........................ | H04L 45/00 370/392 |
| 9,692,706 | B2* | 6/2017 | Basso | ................. | H04L 47/2441 |
| 2005/0163132 | A1* | 7/2005 | Mieno | ................... | H04L 12/465 370/395.53 |
| 2014/0293791 | A1* | 10/2014 | Rabie | .................. | H04L 12/4641 370/235 |
| 2015/0319139 | A1* | 11/2015 | Song | .................... | H04L 12/4641 726/13 |
| 2016/0301614 | A1* | 10/2016 | Concer | ............... | H04L 47/2441 |
| 2017/0180154 | A1* | 6/2017 | Duong | ................ | H04L 12/4633 |

OTHER PUBLICATIONS

Juniper Networks, "Example: Configuring Multichass Link Aggregation in an Active-Active Mode on MX Series Routers", Technical Documentation, Support, Juniper Networks, Inc., https://www.juniper.net/techpubs/en_US/junos14.1/topics/example/interfaces-active-active-bridging-mc-lag-scenario.html, Feb. 23, 2015, 12 pages.

(Continued)

*Primary Examiner* — Kibrom T Hailu
(74) *Attorney, Agent, or Firm* — Harrity & Harrity, LLP

(57) ABSTRACT

A distributed routing system may include a first network device. The first network device may receive a packet that includes a first virtual local area network (VLAN) tag. The first network device may identify a packet priority based on a port via which the packet is received and information included in the first VLAN tag. The first network device may assign a forwarding class to the packet based on the packet priority. The first network device may generate a second VLAN tag that identifies the forwarding class. The first network device may add the second VLAN tag to the packet while keeping the first VLAN tag in the packet. The first network device may transmit the packet, including the first VLAN tag and the second VLAN tag, to a second network device included in the distributed routing system.

20 Claims, 5 Drawing Sheets

(56) References Cited

OTHER PUBLICATIONS

Juniper Networks, "Understanding Junos Fusion Provider Edge Components", Technical Documentation, Support, Juniper Networks, Inc., https://www.juniper.net/documentation/en_US/junos14.2/topics/concept/fusion-components.html, modified Apr. 21, 2016, 5 pages.

Juniper Networks, "Virtual Chassis Fabric Overview", Technical Documentation, Support, Juniper Networks, Inc., https://www.juniper.net/documentation/en_US/junos14.1/topics/concept/vcf-overview.html, modified May 27, 2016, 2 pages.

Wikipedia, IEEE 802.1p, https://en.wikipedia.org/wiki/IEEE_P802.1p, last modified Dec. 13, 2016, 2 pages.

Wikipedia, "IEEE 802.1p", https://en.wikipedia.org/wiki/IEEE_802.1Q, last modified Dec. 11, 2016, 4 pages.

Juniper Networks, "Understanding How Forwarding Classes Assign Classes to Output Queues", Technical Documentation, Support, Juniper Networks, Inc., https://www.juniper.net/techpubs/en_US/junos16.1/topics/concept/forwarding-class-overview-cos-config-guide.html, modified Oct. 10, 2016, 2 pages.

\* cited by examiner

US 10,291,517 B1

GENERATING A DUMMY VLAN TAG FOR INDICATING QUALITY OF SERVICE CLASSIFICATION INFORMATION IN A DISTRIBUTED ROUTING SYSTEM

BACKGROUND

A router may refer to a network device that routes and/or forwards packets between computer networks and/or network devices. A packet is typically forwarded from one router to another through one or more networks that constitute the Internet until the packet reaches a destination device. When a packet is received by a router, the router may read address information included in the packet to determine the destination for the packet. Then, using information stored in a routing table or indicated by a routing policy, the router may direct the packet toward the destination.

SUMMARY

In some implementations, a distributed routing system may include a first network device. The first network device may receive a packet that includes a first virtual local area network (VLAN) tag. The first network device may identify a packet priority based on a port via which the packet is received and information included in the first VLAN tag. The first network device may assign a forwarding class to the packet based on the packet priority. The first network device may generate a second VLAN tag that identifies the forwarding class. The first network device may add the second VLAN tag to the packet while keeping the first VLAN tag in the packet. The first network device may transmit the packet, including the first VLAN tag and the second VLAN tag, to a second network device included in the distributed routing system.

In some implementations, a first network device may include one or more processors to receive a packet that includes a first virtual local area network (VLAN) tag. The one or more processors may identify a forwarding class, to be assigned to the packet, based on a port via which the packet is received and information included in the first VLAN tag. The forwarding class may indicate a priority associated with the packet within a distributed routing system that includes the first network device. The one or more processors may assign the forwarding class to the packet based on identifying the forwarding class. The one or more processors may generate a second VLAN tag that identifies the forwarding class. The one or more processors may add the second VLAN tag to the packet. The one or more processors may transmit the packet, including the first VLAN tag and the second VLAN tag, to a second network device included in the distributed routing system.

In some implementations, a method may include receiving, by a first network device, a packet that includes a first virtual local area network (VLAN) tag. The method may include identifying, by the first network device, a packet priority based on a port via which the packet is received and priority code point (PCP) bits included in the first VLAN tag. The method may include assigning, by the first network device, a forwarding class to the packet based on the packet priority. The method may include generating, by the first network device, a second VLAN tag that identifies the forwarding class. The method may include adding, by the first network device, the second VLAN tag to the packet. The method may include transmitting, by the first network device and to a second network device included in a distributed routing system with the first network device, the packet that includes the first VLAN tag and the second VLAN tag.

DETAILED DESCRIPTION

The following detailed description of example implementations refers to the accompanying drawings. The same reference numbers in different drawings may identify the same or similar elements.

A distributing routing system may include multiple network devices with separate sets of ingress ports for receiving network traffic, such as packets. In some cases, a network device may prioritize a packet based on a priority indicator included in the packet (e.g., a priority code point (PCP)) and an ingress port via which the packet is received by the network device. However, when a first network device in a distributed routing system transmits that packet to a second network device in the distributed routing system, the second network device may receive the packet on a different ingress port, and may prioritize the packet differently than the first network device when the prioritization depends on the ingress port via which the packet is received. In this case, the packet may be processed incorrectly, and a priority for the packet may not be maintained consistently throughout the distributed routing system.

One way to maintain consistent packet prioritization across network devices included in a distributed routing system is to standardize the priority indicators across all ingress ports of all network devices included in the distributed routing system. However, this may require standardization of ingress ports, which may waste computing resources and prevent ingress ports from being customized for efficient handling of particular types of network traffic. For example, ingress ports designed to handle high priority traffic may be designed with larger buffers to prevent packet loss, and ingress ports designed to handle low priority traffic may be designed with smaller buffers. If all ingress ports are standardized, then every ingress port may need to be designed with a large buffer, thereby wasting memory resources of the network device.

Another way to maintain consistent packet prioritization throughout the distributed routing system is for the first network device to overwrite the priority indicator so that the packet is properly handled by the second network device. However, this may lead to improper prioritization of the packet when the packet leaves the distributed routing system.

Implementations described herein use a dummy VLAN tag to ensure consistent packet prioritization across network devices included in a distributed routing system. In this way, network traffic may be properly processed according to a priority, without the need to standardize the priority indicators across all ingress ports of the network devices and/or without overwriting the priority indicator. Furthermore, these implementations may be used to achieve end-to-end lossless traffic transmission by using a high priority forwarding class within the distributed routing system.

Figure 1A:
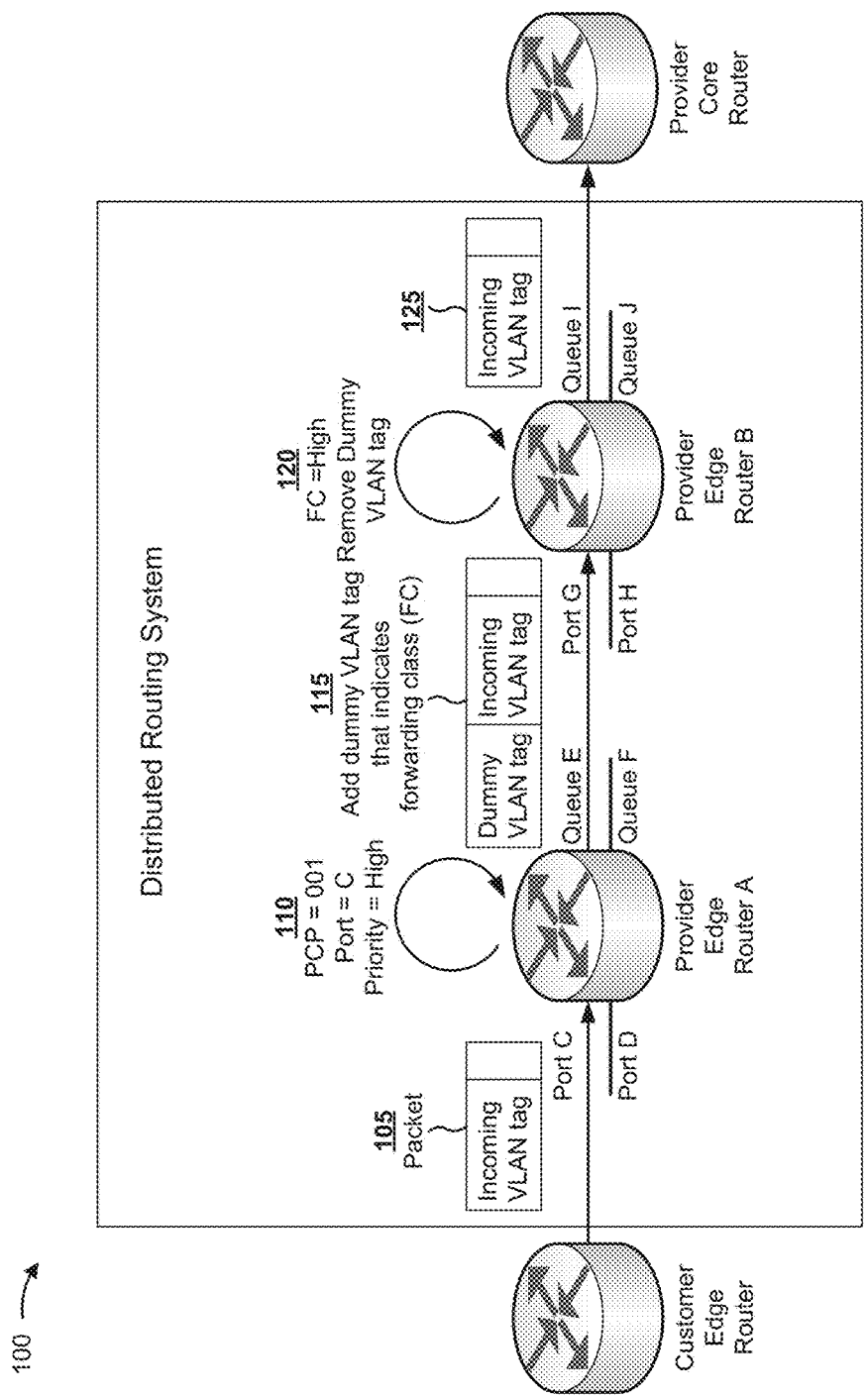
FIGS. 1A and 1B are diagrams of an overview of an example implementation described herein.
Figure 1B:
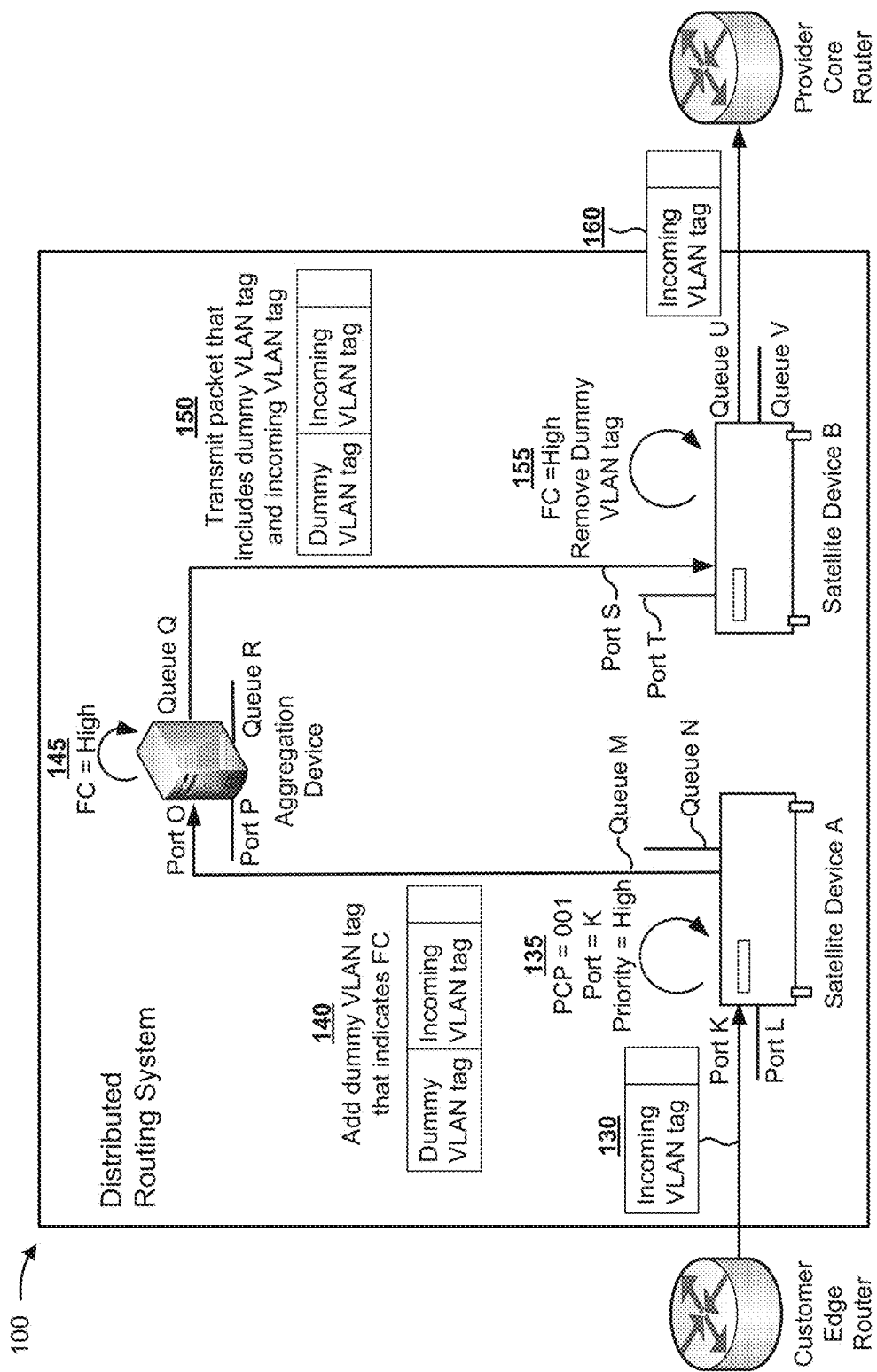

FIGS. 1A and 1B are diagrams of an overview of an example implementation 100 described herein. As shown in FIGS. 1A and 1B, a dummy VLAN tag may be used to ensure consistent packet prioritization across network devices in particular distributed routing systems, such as a multi-chassis link aggregation group (MC-LAG) distributed routing system (shown in FIG. 1A) and/or an aggregated routing system (shown in FIG. 1B).

As shown in FIG. 1A, the MC-LAG distributed routing system may include a first provider edge router (e.g., provider edge router A) and a second provider edge router (e.g., provider edge router B) for transferring traffic between, for example, a customer edge router and a provider core router. As shown by reference number 105, provider edge router A may receive, from the customer edge router, a packet that includes a first VLAN tag (e.g., an original VLAN tag). The packet may be received on port C, and port C may be configured to interpret the original VLAN tag of the packet in a particular way.

As shown by reference number 110, provider edge router A may identify a packet priority (e.g., high priority) by interpreting a PCP field of the original VLAN tag to determine that the bits in the PCP field are set to a bit combination of 001. In this case, port C of provider edge router A may be configured to interpret the bit combination of 001 as an indication that the packet is high priority. In some implementations, provider edge router A may assign a forwarding class to the packet based on the packet priority indicated by the PCP value and the port. For example, provider edge router A may compare the PCP value and a port identifier to information stored by a data structure to determine the forwarding class that corresponds to the packet priority represented by the combination of PCP value and port identifier. In this case, provider edge router A may use the forwarding class to assign the packet to an output queue (e.g., queue E, which handles high priority traffic in the example of FIG. 1A).

As further shown, provider edge router A may generate a second VLAN tag (e.g., a dummy VLAN tag) that indicates the forwarding class in the PCP field of the dummy VLAN tag. The forwarding class values, indicated in the dummy VLAN tag, may be standardized across network devices included in the distributed routing system, while the PCP value included in the original VLAN tag may not be standardized across the network devices. For example, the same forwarding class value may map to the same priority across different network devices (e.g., regardless of the ingress port on which the packet is received), while the same PCP value may map to different priorities across different network devices (e.g., depending on an ingress port on which the packet is received). By generating a dummy VLAN tag that indicates the forwarding class, the network devices may ensure consistent packet prioritization.

As shown by reference number 115, provider edge router A may add the dummy VLAN tag to the packet (while preserving the original VLAN tag in the packet), and may transmit the packet to provider edge router B. As shown by reference number 120, provider edge router B may classify the packet by using the forwarding class to assign the packet to a queue. For example, the PCP field of the dummy VLAN tag may indicate the forwarding class, and provider edge router B may use the forwarding class to assign the packet to an output queue (e.g., queue I). As further shown, provider edge router B may remove the dummy VLAN tag from the packet to return the packet to a state that the packet was in when the packet entered the distributed routing system (e.g., with the original VLAN tag and without the dummy VLAN tag). This may ensure proper packet prioritization outside of the distributed routing system. As shown by reference number 125, provider edge router B may transmit the packet, with the original VLAN tag and without the dummy VLAN tag, to the provider core router. The provider core router may send the packet to another device in the network based on the priority indicated by the PCP value in the original VLAN tag. By using the PCP value in the original VLAN tag, the packet is processed with the same priority that was intended prior to the packet entering the distributed routing system.

As shown in FIG. 1B, a distributed routing system may include an aggregated routing system that includes a first satellite device (e.g., satellite device A) and a second satellite device (e.g., satellite device B) for transferring traffic between a customer edge router and a provider core router. The first satellite device and the second satellite device may communicate using an aggregation device as an intermediary. As shown by reference number 130, satellite device A may receive, from the customer edge router, a packet that includes an original VLAN tag. The packet may be received on port K, and port K may be configured to interpret the original VLAN tag of the packet in a particular way.

As shown by reference number 135, satellite device A may identify a packet priority (e.g., high priority) by interpreting a PCP field of the original VLAN tag to determine that the bits in the PCP field are set to a bit combination of 001. In this case, port K of satellite device A may be configured to interpret the bit combination of 001 as an indication that the packet is high priority. In some implementations, satellite device A may assign a forwarding class to the packet based on the packet priority indicated by the PCP value and the port. For example, satellite device A may compare the PCP value and a port identifier to information stored by a data structure to determine the forwarding class that corresponds to the packet priority represented by the combination of PCP value and port identifier. In this case, satellite device A may use the forwarding class to assign the packet to an output queue (e.g., queue M, which handles high priority traffic in the example of FIG. 1B).

As further shown, satellite device A may generate a dummy VLAN tag that indicates the forwarding class in the PCP field of the dummy VLAN tag. The forwarding class values, indicated in the dummy VLAN tag, may be standardized across network devices included in the distributed routing system, while the PCP value included in the original VLAN tag may not be standardized across the network devices. For example, the same forwarding class value may map to the same priority across different network devices (e.g., regardless of the ingress port on which the packet is received), while the same PCP value may map to different priorities across different network devices (e.g., depending on an ingress port on which the packet is received). By generating a dummy VLAN tag that indicates the forwarding class, the network devices may ensure consistent packet prioritization, and may be used to provide end-to-end lossless communications.

As shown by reference number 140, satellite device A may add the dummy VLAN tag to the packet, and may transmit the packet to a port on the aggregation device (e.g., cascade port O). As shown by reference number 145, the aggregation device may classify the packet by using the forwarding class to assign the packet to a queue. For example, the PCP field of the dummy VLAN tag may indicate the forwarding class, and the aggregation device may use the forwarding class to assign the packet to an output queue (e.g., queue Q). As shown by reference number 150, the aggregation device may transmit the packet, with the dummy VLAN tag and the original VLAN tag, to port S of satellite device B.

As shown by reference number 155, satellite device B may classify the packet by using the forwarding class to assign the packet to a queue. For example, the PCP field of the dummy VLAN tag may indicate the forwarding class, and satellite device B may use the forwarding class to assign the packet to an output queue (e.g., queue U). As further shown, satellite device B may remove the dummy VLAN tag from the packet to return the packet to a state that the packet was in when the packet entered the distributed routing system (e.g., with the original VLAN tag and without the dummy VLAN tag). By indicating the forwarding class in the dummy VLAN tag, and transmitting the packet with the dummy VLAN tag throughout the distributed routing system, network devices within the distributed routing system (e.g., a provider edge router, a satellite device, etc.) efficiently standardize packet prioritization.

As indicated above, FIGS. 1A and 1B are provided merely as examples. Other examples are possible and may differ from what was described with regard to FIGS. 1A and 1B. For example, while the traffic flow shown in FIGS. 1A and 1B flows from the customer edge router to the provider core router, in other cases, the traffic flow may begin with the provider core router and may flow to the customer edge router, may flow between two other types of devices, or the like. Furthermore, although the satellite device of FIG. 1B is shown as generating and adding the dummy VLAN tag, in some implementations, the aggregation device may generate and add the dummy VLAN tag.

Figure 2:
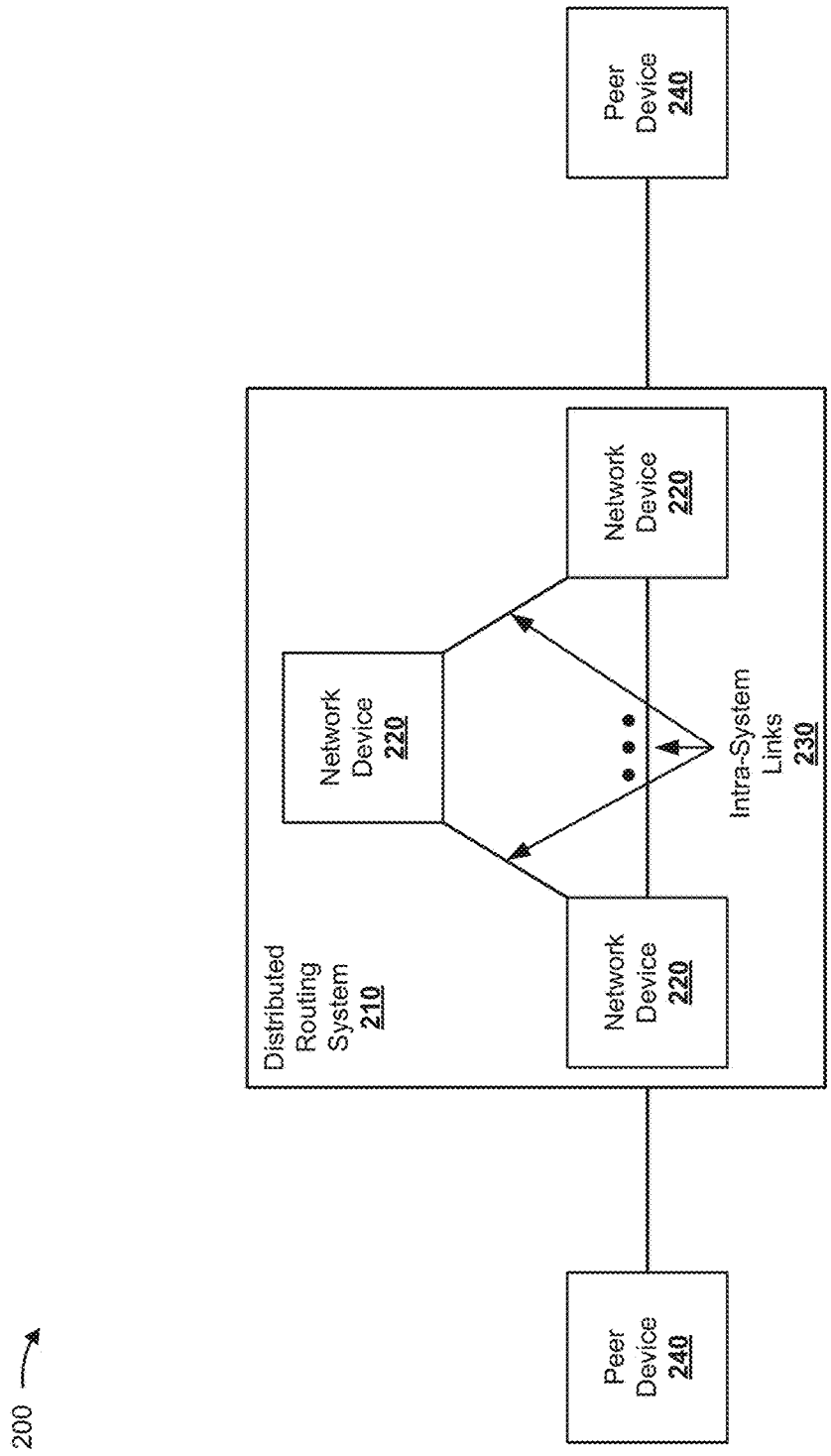
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a distributed routing system 210, a set of network device 220, one or more intra-system links 230, and a set of peer devices 240. Devices of environment 200 may interconnect via wired connections, wireless connections, or a combination of wired and wireless connections.

Distributed routing system 210 includes multiple network devices 220 capable of behaving as a single network device to devices external to the distributed routing system 210. For example, distributed routing system 210 may include multiple network devices 220 connected to peer device 240, and the multiple network devices 220 may be able to communicate with peer device 240 without peer device 240 being able to determine which network device 220 is transmitting and/or receiving a communication. For example, distributed routing system 210 may include an MC-LAG routing system, an aggregated routing system, a spine-and-leaf routing system, and/or the like.

Network device 220 includes one or more devices (e.g., one or more traffic transfer devices) capable of processing and/or transferring traffic between endpoint devices (e.g., peer devices 240). For example, network device 220 may include a router (e.g., a provider edge router), a satellite device, an aggregation device, a switch, a gateway, a firewall, a hub, a bridge, a reverse proxy, a server (e.g., a proxy server, a server executing a virtual machine, etc.), a security device, a load balancer, a line card (e.g., in a chassis-based system), or a similar device.

Intra-system link 230 includes one or more links that connect network devices 220 within distributed routing system 210. For example, intra-system link 230 may include one or more cables (e.g., fiber optic cable(s)) that attach to ports of network devices 220. In some implementations, intra-system link 230 may represent a wireless connection between network devices 220. In some cases, intra-system links 230 may include inter-chassis links (ICLs) that connect a network device 220 (e.g., a provider edge router) with a different network device 220 (e.g., a different provider edge router), with a customer edge router, with a provider core router, or the like. In other cases, intra-system link 230 may include a cascade link that connects a network device 220 (e.g., a satellite device, an aggregation device, etc.) with a different network device 220 (e.g., a different satellite device, etc.), with a customer edge router, with a provider core router, or the like. In some implementations, ingress port information may be lost when traffic is sent across intra-system link 230.

Peer device 240 includes one or more devices capable of receiving and/or providing network traffic. For example, peer device 240 may include a traffic transfer device, such as a router, a switch, a gateway, a firewall, a hub, a bridge, a reverse proxy, a server (e.g., a proxy server, a server executing a virtual machine, etc.), a security device, a load balancer, or a similar device. Additionally, or alternatively, peer device 240 may include an endpoint device that is a source or a destination for network traffic. For example, peer device 240 may include a computer or a similar device. Peer device 240 may receive network traffic from and/or may provide network traffic to distributed routing system 210 without controlling which network device 220, within distributed routing system 210, communicates with peer device 240. In some implementations, peer device 240 may include a customer edge router and/or a provider core router, as shown in FIGS. 1A-1B.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
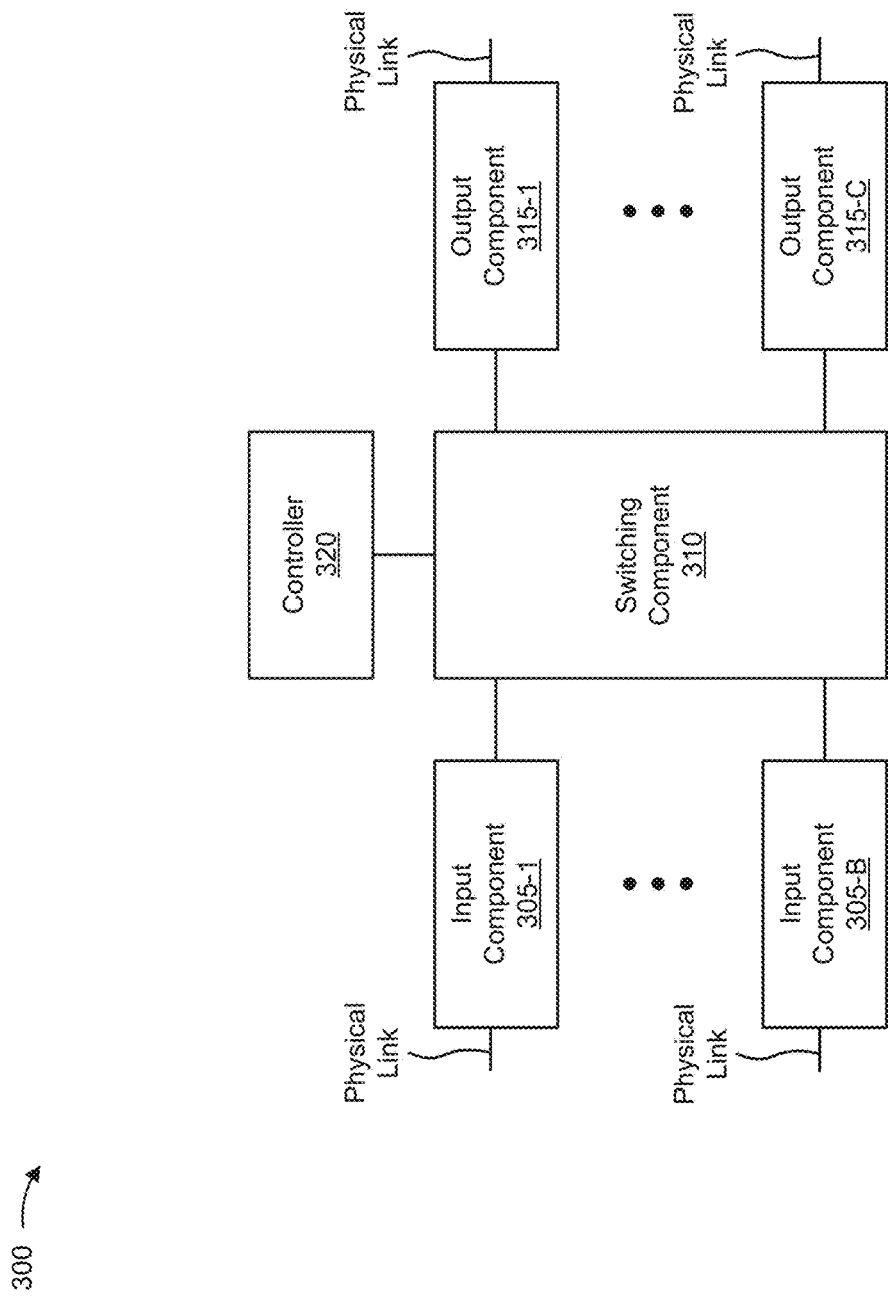
FIG. 3 is a diagram of example components of one or more devices of FIG. 2.

FIG. 3 is a diagram of example components of a device 300. Device 300 may correspond to distributed routing system 210, network device 220, and/or peer device 240. In some implementations, distributed routing system 210, network device 220, and/or peer device 240 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may transmit and/or receive packets.

In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may transmit packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
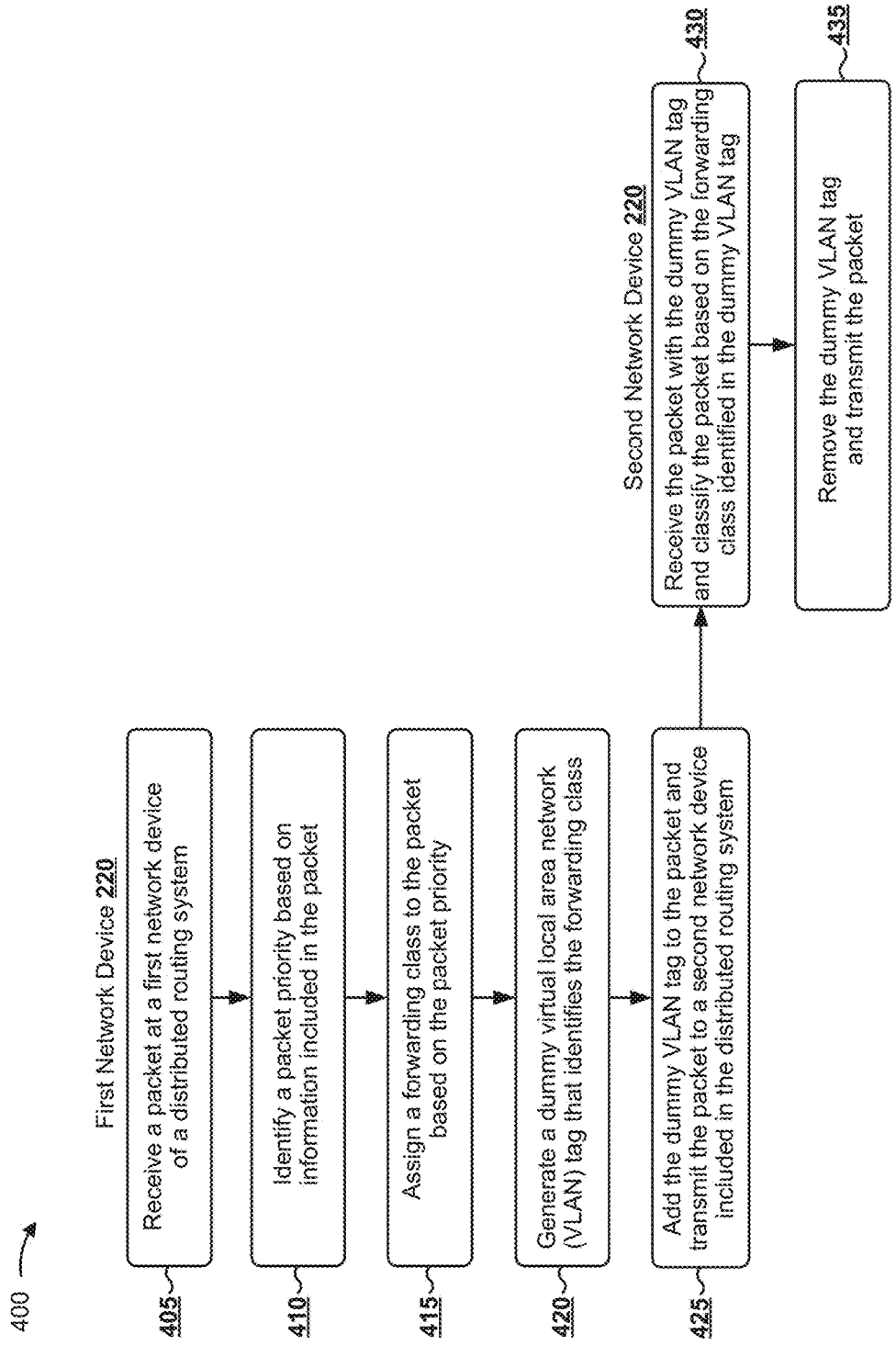
FIG. 4 is a flow chart of an example process for generating a dummy virtual local area network (VLAN) tag to ensure consistent packet prioritization across network devices in a distributed routing system.

FIG. 4 is a flow chart of an example process 400 for generating a dummy VLAN tag to ensure consistent packet prioritization across network devices in a distributed routing system. In some implementations, one or more process blocks of FIG. 4 may be performed by network device(s) 220 within distributed routing system 210. In some implementations, one or more process blocks of FIG. 4 may be performed by another device or a group of devices separate from or including network device(s) 220, such as peer device 240.

As shown in FIG. 4, process 400 may include receiving a packet at a first network device of a distributed routing system (block 405). For example, first network device 220 (e.g., a provider edge router, a satellite device, an aggregation device, etc.) may be part of distributed routing system 210 that includes one or more other network devices 220, and first network device 220 may receive a packet from first peer device 240 (e.g., a customer edge router). A packet may refer to a communication structure for communicating information, such as a protocol data unit (PDU), a network packet, a frame, a datagram, a segment, a message, a block, a cell, a frame, a subframe, a slot, a symbol, a portion of any of the above, and/or another type of formatted or unformatted unit of data capable of being transmitted via a network.

In some implementations, first network device 220 may receive a packet that includes an original VLAN tag. The original VLAN tag may include a tag protocol identifier (TPID) field and a tag control information (TCI) field. The TCI field may include a priority code point (PCP) field, a drop eligible indicator (DEI) field, a VLAN identifier (VID) field, or the like. In some cases, first network device 220 may receive the packet via a port, and the port may, in conjunction with the PCP field of the original VLAN tag, be used to determine a packet priority, as described below. The packet priority may be determined differently at different network devices 220 included in distributed routing system 210 depending on a port via which the packet is received on the different network devices 220. To ensure consistent packet prioritization across network devices 220 included in the distributed routing system 210 regardless of a port via which a packet is received, first network device 220 may generate a dummy VLAN tag for the packet. The dummy VLAN tag may indicate a standardized forwarding class used for consistent packet prioritization across network devices 220, as described below.

As further shown in FIG. 4, process 400 may include identifying a packet priority based on information included in the packet (block 410). For example, first network device 220 may identify a packet priority based on the PCP field included in the original VLAN tag and the port on which the packet is received. The packet priority may indicate a manner in which to treat packets, and may be identified with a priority indicator, such as a PCP value in a PCP field, a differentiated services code point (DSCP) of differentiated services (DiffServ), a class of service indicator (CoS), a QoS class identifier (QCI), or the like. Within distributed routing system 210, network devices 220 (e.g., first network device 220, second network device 220, etc.) may treat the same PCP field values differently depending on the port at which the packet is received.

In some implementations, first network device 220 may identify the packet priority based on bits included in the PCP field of the original VLAN tag and a configuration of the port on which the packet is received. For example, the PCP field of the VLAN tag may include a bit combination, and first network device 220 may be configured to treat the bit combination, as received at the port, as corresponding to a particular priority level. As an example, first network device 220 may receive, via a port, a packet that includes a PCP field bit combination of 001, and first network device 220 may be configured to treat the bit combination of 001 as corresponding to a low priority level. Additionally, or alternatively, first network device 220 may identify the packet priority based on another type of priority indicator, such as a DSCP of DiffServ, a CoS, a QCI, or the like.

As further shown in FIG. 4, process 400 may include assigning a forwarding class to the packet based on the packet priority (block 415). The forwarding class, which may be part of a group of forwarding classes, may indicate a packet priority and/or a relationship between the packet priority and one or more output queues. The one or more output queues may include properties that may be used to treat packets differently. For example, the one or more output queues may treat packets differently based on a priority level, a transmission rate, a latency level, an amount of delay, an amount of jitter, or the like. In addition, network devices 220 (e.g., first network device 220, second network device 220, etc.) may uniformly store information indicating the forwarding classes, which may ensure that the packets will be prioritized properly on all network devices 220 within distributed routing system 210.

In some implementations, first network device 220 may assign the forwarding class by comparing the packet priority to information stored by a data structure that maps packet priorities to forwarding classes. For example, first network device 220 may use a value that indicates the packet priority to query a data structure for a corresponding packet priority value that is mapped to a forwarding class. Additionally, or alternatively, first network device 220 may assign the forwarding class by comparing a PCP value and a port indicator, that combine to represent the packet priority, to information stored by a data structure that maps combinations of PCP values and port indicators to forwarding classes. First network device 220 may then use the forwarding class to assign the packet to an output queue that is associated with the forwarding class.

As an example, first network device 220 may assign the forwarding class by comparing the packet priority to information stored by a hash table that maps the packet priorities to forwarding classes. For example, a PCP value and a value associated with a port indicator may be hashed (e.g., converted into an integer value, a string, etc.), and the resulting hash may be compared to hashed entries stored by the hash table (e.g., a value corresponding to the resulting hash may be mapped to a forwarding class). In this way, first network device 220 saves memory resources by utilizing an efficient data structure such as a hash table.

By prioritizing the packet based on the forwarding class, first network device 220 standardizes packet prioritization in a manner that may be replicated across multiple network devices 220 of distributed routing system 210.

As further shown in FIG. 4, process 400 may include generating a dummy virtual local area network (VLAN) tag that identifies the forwarding class (block 420). For example, first network device 220 may generate a dummy VLAN tag that identifies a forwarding class by setting one or more TCI field bits in the dummy VLAN tag (e.g., by setting bits in the PCP field and/or the VID field).

In some implementations, first network device 220 may generate a dummy VLAN tag that identifies the forwarding class by setting bits in a PCP field of the dummy VLAN tag. For example, the bits in the PCP field of the dummy VLAN tag may be set to indicate the forwarding class. By setting PCP field bit values to indicate the forwarding class, instead of setting bit values that may be interpreted based on a particular port configuration, first network device 220 is able to transmit the packet to other network devices 220 while maintaining a standardized packet priority scheme, which improves network communications.

In some cases, while generating the dummy VLAN tag, first network device 220 may set bits in a VID field of the dummy VLAN tag to the same value as the VID field included in the original VLAN tag. Additionally, or alternatively, first network device 220 may set a value of the dummy VLAN tag (e.g., in an EtherType field or another field) to indicate that the VID is to be read (e.g., by another network device 220 that receives the packet) from the dummy VLAN tag and not the original VLAN tag.

In other cases, if first network device 220 cannot copy the VID field from the original VLAN tag (e.g., due to a configuration limitation), first network device 220 may set bits in the VID field of the dummy VLAN tag to a default value (e.g., zero). Additionally, or alternatively, first network device 220 may set a value of the dummy VLAN tag (e.g., in an EtherType field or another field) to indicate that the VID is to be read from the original VLAN tag and not the dummy VLAN tag. By setting bit values in the VID field of the dummy VLAN tag and/or setting bit values to indicate where the VID is to be read from, first network device 220 ensures that a network device 220 that receives the packet is able to identify the VLAN to which the packet belongs.

Additionally, or alternatively, first network device 220 may copy one or more values for other fields in the original VLAN tag to the dummy VLAN tag (e.g., a bit value in the TPID field, a bit value in the DEI field, etc.), or first network device 220 may set default values for the other fields of the dummy VLAN tag. The bit values, which indicate from where to read the other field values, may be indicated in the same manner described above.

As further shown in FIG. 4, process 400 may include adding the dummy VLAN tag to the packet and transmitting the packet to a second network device included in the distributed routing system (block 425). For example, first network device 220 may add (e.g., append) the dummy VLAN tag to the packet, and first network device 220 may transmit the packet (e.g., that includes the original VLAN tag and the dummy VLAN tag) to second network device 220 included in distributed routing system 210.

In some implementations, first network device 220 may add the dummy VLAN tag to the packet, without removing or modifying any information already included in the packet. For example, first network device 220 may add the dummy VLAN tag to the packet immediately before, or immediately after, a bit-field associated with the original VLAN tag. As an example, the original VLAN tag and the dummy VLAN tag may be located in a header of the packet, between source media access control (MAC) address and EtherType bit-fields of an Ethernet frame. By adding the dummy VLAN tag to the packet, first network device 220 provides for consistent packet prioritization within distributed routing system 210, while allowing the original VLAN tag to remain in its original state (e.g., relative to entering distributed routing system 210), which ensures that the original VLAN tag will be properly interpreted when the packet is sent to a device outside of distributed routing system 210.

In some implementations, first network device 220 may add the dummy VLAN tag to the packet, and may also modify information in the original VLAN tag before transmitting the packet. For example, first network device 220 may modify (e.g., add, remove, alter, etc.) information in the original VLAN tag, and the packet, which includes the modification to the original VLAN tag, may be received outside of distributed routing system 210.

In some implementations, first network device 220 may transmit the packet to second network device 220 using the output queue assigned by the forwarding class. For example, first network device 220 may transmit the packet to second network device 220 prior to transmitting packets associated with a lower priority output queue, after transmitting packets associated with a higher priority output queue, in a round robin fashion that is based on packet priority, and/or the like. By transmitting packets based on the output queue assigned by the forwarding class, first network device 220 ensures consistent packet prioritization throughout distributed routing system 210.

As further shown in FIG. 4, process 400 may include receiving the packet with the dummy VLAN tag and classifying the packet based on the forwarding class identified in the dummy VLAN tag (block 430). For example, second network device 220 may receive the packet with the dummy VLAN tag and may classify the packet based on the forwarding class identified in the PCP field of the dummy VLAN tag.

In some implementations, second network device 220 may classify the packet by determining a priority of the packet, which may be indicated by the forwarding class in the PCP field of the dummy VLAN tag. For example, second network device 220 may determine the priority of the packet by interpreting bits included in the PCP field of the dummy VLAN tag. In this way, second network device 220 uses the forwarding class to map the priority to an output queue in the same manner as other devices in distributed routing system 210 (e.g., first network device 220). By classifying the packet in the same manner as other network devices, second network device 220 ensures consistent packet prioritization while transferring packets within distributed routing system 210.

As further shown in FIG. 4, process 400 may include removing the dummy VLAN tag and transmitting the packet (block 435). For example, second network device 220 may remove the dummy VLAN tag and transmit the packet when the recipient of the packet is a device external to distributed routing system 210 (e.g., second peer device 240). Second network device 220 may transmit the packet without removing the dummy VLAN tag when the recipient of the packet is a device within distributed routing system 210 (e.g., a different network device 220). In other words, second network device 220 may remove the dummy VLAN tag when transmitting the packet outside of distributed routing system 210, and may preserve the dummy VLAN tag when transmitting the packet within distributed routing system 210.

In some implementations, if second network device 220 is transmitting the packet to second peer device 240, then second network device 220 may remove the dummy VLAN tag prior to transmitting the packet. For example, second network device 220 may remove the dummy VLAN tag to ensure that proper packet prioritization occurs outside of distributed routing system 210. In this case, the dummy VLAN tag may be removed to ensure that a device that is external to distributed routing system 210 (e.g., second peer device 240) may receive the packet in the same manner as when the packet entered distributed routing system 210. After the dummy VLAN tag is removed, second network device 220 may transmit the packet to second peer device 240 by using the forwarding class to assign the packet to an output queue, in the same manner described above. Second peer device 240 may use the PCP value in the original VLAN tag to perform packet prioritization.

In some implementations, if second network device 220 is transmitting the packet to another device within distributed routing system 210 (e.g., third network device 220), then second network device 220 may include the dummy VLAN tag in the packet. In some implementations, second network device 220 may preserve the existing dummy VLAN tag (e.g., by transmitting the packet with the existing dummy VLAN tag). In some implementations, second network device 220 may be transmitting the packet to a device within distributed routing system 210 that, due to a configuration limitation, cannot process information in the dummy VLAN tag. In this case, second network device 220 may remove the dummy VLAN tag, may generate a different dummy VLAN tag (e.g., with different values for the VID field or another field), may append the different VLAN tag to the packet, and may transmit the packet to third network device 220.

By removing the dummy VLAN tag prior to transmitting the packet outside of distributed routing system 210, second network device 220 ensures that devices outside of distributed routing system 210 are able to receive the same packet priority that was originally sent to and received by distributed routing system 210 (e.g., the packet priority indicated by both the PCP field in the original VLAN tag and the port configuration of the device receiving the packet).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein assist with properly processing packets according to a priority, without the need to standardize priority indicators across all ingress ports of the network devices or overwriting the priority indicator in the PCP field of the original VLAN tag. Furthermore, if network devices already have VLAN tag modification features installed (e.g., an add VLAN tag feature, a swap VLAN tag feature, a delete VLAN tag feature, etc.), distributed routing system 210 can implement the packet prioritization scheme without any additional hardware redesign cost.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A distributed routing system, comprising:
a first network device to:
receive a packet that includes a first virtual local area network (VLAN) tag;
identify a packet priority based on a port via which the packet is received and information included in the first VLAN tag;
assign a forwarding class to the packet based on:
comparing the packet priority to information stored by a hash table that maps packet priorities to forwarding classes,
a priority code point (PCP) value and a value associated with a port indicator being hashed and compared to entries stored by the hash table, and
the forwarding class including standardized values that are standardized across network devices included in the distributed routing system;
generate a second VLAN tag that identifies the forwarding class;
identify the forwarding class in a PCP field, of the second VLAN tag,
the forwarding class being used to assign an output queue based on the packet priority;
add the second VLAN tag to the packet while keeping the first VLAN tag in the packet;
transmit the packet, including the first VLAN tag and the second VLAN tag, to a second network device included in the distributed routing system,
the forwarding class being used to map the packet priority to a particular output queue regardless of an ingress port of the second network device in which the packet is received; and
the second network device being configured to:
receive the transmitted packet;
classify, based on the forwarding class, the transmitted packet;
remove, based on determining that the transmitted packet is to be transmitted outside of the distributed routing system, the second VLAN tag from the transmitted packet; and
transmit, based on classifying the packet and after removing the second VLAN tag from the transmitted packet, the transmitted packet outside of the distributed routing system.

2. The distributed routing system of claim 1, where the first network device, when assigning the forwarding class to the packet, is to:
assign the forwarding class based on the port and the PCP value, of the PCP field, the PCP value being included in the first VLAN tag.

3. The distributed routing system of claim 1, where the first network device, when adding the second VLAN tag to the packet, is to:
add the second VLAN tag to the packet without modifying information included in the first VLAN tag.

4. The distributed routing system of claim 1, where the second network device, when classifying the transmitted packet based on the forwarding class, is to:
determine the packet priority by interpreting bits in the PCP field included in the second VLAN tag.

5. The distributed routing system of claim 1, where the first network device and the second network device uniformly store information indicating the forwarding class.

6. The distributed routing system of claim 1, where the information included in the first VLAN tag includes at least one of:
the PCP field,
a differentiated services code point (DSCP) of differentiated services (DiffServ),
a class of service indicator (CoS), or
a QoS class identifier (QCI).

7. The distributed routing system of claim 1, where the first network device, when generating the second VLAN tag that identifies the forwarding class, is to at least one of:
set the forwarding class in a VLAN identifier (VID) field, of the second VLAN tag, to a value equal to a value of a VID field of the first VLAN tag;
set the forwarding class in a tag protocol identifier (TPID) field, of the second VLAN tag, to a value equal to a value of a TPID field of the first VLAN tag; or
set the forwarding class in a drop eligible indicator (DEI) field, of the second VLAN tag, to a value equal to a value of a DEI field of the first VLAN tag.

8. A first network device, comprising:
one or more memories; and
one or more processors to:
receive a packet that includes a first virtual local area network (VLAN) tag;

identify a forwarding class, to be assigned to the packet, based on a port via which the packet is received and information included in the first VLAN tag,
the forwarding class indicating a priority associated with the packet within a distributed routing system that includes the first network device;
assign the forwarding class to the packet based on comparing the packet priority to information stored by a hash table that maps packet priorities to forwarding classes,
a priority code point (PCP) value and a value associated with a port indicator being hashed and compared to entries stored by the hash table, and
the forwarding class including standardized values that are standardized across network devices included in the distributed routing system;
generate a second VLAN tag that identifies the forwarding class;
identify the forwarding class in a PCP field, included the second VLAN tag,
the forwarding class being used to assign an output queue based on the priority associated with the packet;
add the second VLAN tag to the packet;
transmit the packet, including the first VLAN tag and the second VLAN tag, to a second network device included in the distributed routing system,
the forwarding class being used to map the priority associated with the packet to a particular output queue regardless of an ingress port of the second network device in which the packet is received; and
the second network device being configured to:
receive the transmitted packet;
classify, based on the forwarding class, the transmitted packet;
remove, based on determining that the transmitted packet is to be transmitted outside of the distributed routing system, the second VLAN tag from the transmitted packet; and
transmit, based on classifying the packet and after removing the second VLAN tag from the transmitted packet, the transmitted packet outside of the distributed routing system.

9. The first network device of claim 8, where the one or more processors, when assigning the forwarding class to the packet, are to:
assign the forwarding class based on the port and the PCP value, of the PCP field, the PCP value being included in the first VLAN tag.

10. The first network device of claim 8, where the one or more processors, when generating the second VLAN tag that identifies the forwarding class, are to:
set the forwarding class in a VLAN identifier (VID) field, of the second VLAN tag, to a value equal to a value of a VID field of the first VLAN tag.

11. The first network device of claim 8, where the one or more processors are further to:
modify information included in the first VLAN tag before transmitting the packet.

12. The first network device of claim 8, where the one or more processors, when adding the second VLAN tag to the packet, are to:
add the second VLAN tag to the packet without modifying information included in the first VLAN tag.

13. The first network device of claim 8, where the one or more processors, when transmitting the packet, are to:
transmit the packet using the particular output queue associated with the forwarding class.

14. The first network device of claim 8, where the first network device and the second network device uniformly store information indicating the forwarding class.

15. The first network device of claim 8, where the one or more processors, when generating the second VLAN tag that identifies the forwarding class, are to at least one of:
set the forwarding class in a VLAN identifier (VID) field, of the second VLAN tag, to a value equal to a value of a VID field of the first VLAN tag;
set the forwarding class in a tag protocol identifier (TPID) field, of the second VLAN tag, to a value equal to a value of a TPID field of the first VLAN tag; or
set the forwarding class in a drop eligible indicator (DEI) field, of the second VLAN tag, to a value equal to a value of a DEI field of the first VLAN tag.

16. A method, comprising:
receiving, by a first network device, a packet that includes a first virtual local area network (VLAN) tag;
identifying, by the first network device, a packet priority based on a port via which the packet is received and priority code point (PCP) bits included in the first VLAN tag;
assigning, by the first network device, a forwarding class to the packet based on comparing the packet priority to information stored by a hash table that maps packet priorities to forwarding classes,
a PCP value and a value associated with a port indicator being hashed and compared to entries stored by the hash table, and
the forwarding class including standardized values that are standardized across network devices included in a distributed routing system;
generating, by the first network device, a second VLAN tag that identifies the forwarding class;
identifying, by the first network device, the forwarding class in a PCP field, included in the second VLAN tag,
the forwarding class being used to assign an output queue based on the packet priority,
adding, by the first network device, the second VLAN tag to the packet;
transmitting, by the first network device and to a second network device included in a distributed routing system with the first network device, the packet that includes the first VLAN tag and the second VLAN tag,
the forwarding class being used to map the packet priority to a particular output queue regardless of an ingress port of the second network device in which the packet is received;
receiving, by the second network device, the transmitted packet;
classifying, by the second network device and based on the forwarding class, the transmitted packet;
removing, by the second network device and based on determining that the transmitted packet is to be transmitted outside of the distributed routing system, the second VLAN tag from the transmitted packet; and
transmitting, by the second network device and based on classifying the packet and after removing the second VLAN tag from the transmitted packet, the transmitted packet outside of the distributed routing system.

17. The method of claim 16, where transmitting the packet comprises:
transmitting the packet via the particular output queue.

18. The method of claim 16, where adding the second VLAN tag to the packet comprises:
   adding the second VLAN tag to the packet without modifying the first VLAN tag in the packet.

19. The method of claim 16, where the first network device and the second network device uniformly store information indicating the forwarding class.

20. The method of claim 16, where generating the second VLAN tag that identifies the forwarding class comprises:
   setting the forwarding class in a VLAN identifier (VID) field, of the second VLAN tag, to a value equal to a value of a VID field of the first VLAN tag;
   setting the forwarding class in a tag protocol identifier (TPID) field, of the second VLAN tag, to a value equal to a value of a TPID field of the first VLAN tag; or
   setting the forwarding class in a drop eligible indicator (DEI) field, of the second VLAN tag, to a value equal to a value of a DEI field of the first VLAN tag.

* * * * *